United States Patent [19]
Hoyt

[11] 3,942,368
[45] Mar. 9, 1976

[54] PORTABLE PULL TESTING UNIT FOR INSTALLED EARTH ANCHORS

[75] Inventor: Robert M. Hoyt, Centralia, Mo.

[73] Assignee: A. B. Chance Company, Centralia, Mo.

[22] Filed: Sept. 9, 1974

[21] Appl. No.: 504,080

[52] U.S. Cl. .................. 73/141 R; 73/84; 73/95
[51] Int. Cl.² .................. G01L 5/00; G01N 3/10
[58] Field of Search .......... 73/88 E, 84, 101, 141 R

[56] References Cited
UNITED STATES PATENTS

| | | | |
|---|---|---|---|
| 2,280,592 | 4/1942 | Le Mieux, Jr. | 73/84 |
| 2,674,876 | 4/1954 | Caudill | 73/84 |
| 3,738,163 | 6/1973 | McEntire | 73/95 |
| 3,797,301 | 3/1974 | Hawes | 73/84 |
| 3,820,384 | 6/1974 | Brill | 73/84 |

FOREIGN PATENTS OR APPLICATIONS

| | | | |
|---|---|---|---|
| 575,050 | 4/1933 | Germany | 73/84 |

Primary Examiner—Charles A. Ruehl
Attorney, Agent, or Firm—Schmidt, Johnson, Hovey & Williams

[57] ABSTRACT

A lightweight, compact, portable pull-testing device is disclosed which is especially adapted for testing the load capabilities of installed, relatively small earth anchors such as those utilized with hold-down equipment for mobile homes or the like. The device includes a tripod-mounted, vertically adjustable, hydraulically actuated piston and cylinder assembly securable to the upper protruding end of an earth anchor shaft, with generally upright tripod support legs positioned closely adjacent the protruding shaft end to permit use of the device by a single operator in crowded areas such as beneath a mobile home where space is at a premium. Novel creep indicator apparatus is also disclosed for the accurate measurement of anchor creepage independent of any settling of the device itself into the earth which may occur during pull testing.

7 Claims, 1 Drawing Figure

U.S. Patent  March 9, 1976  3,942,368
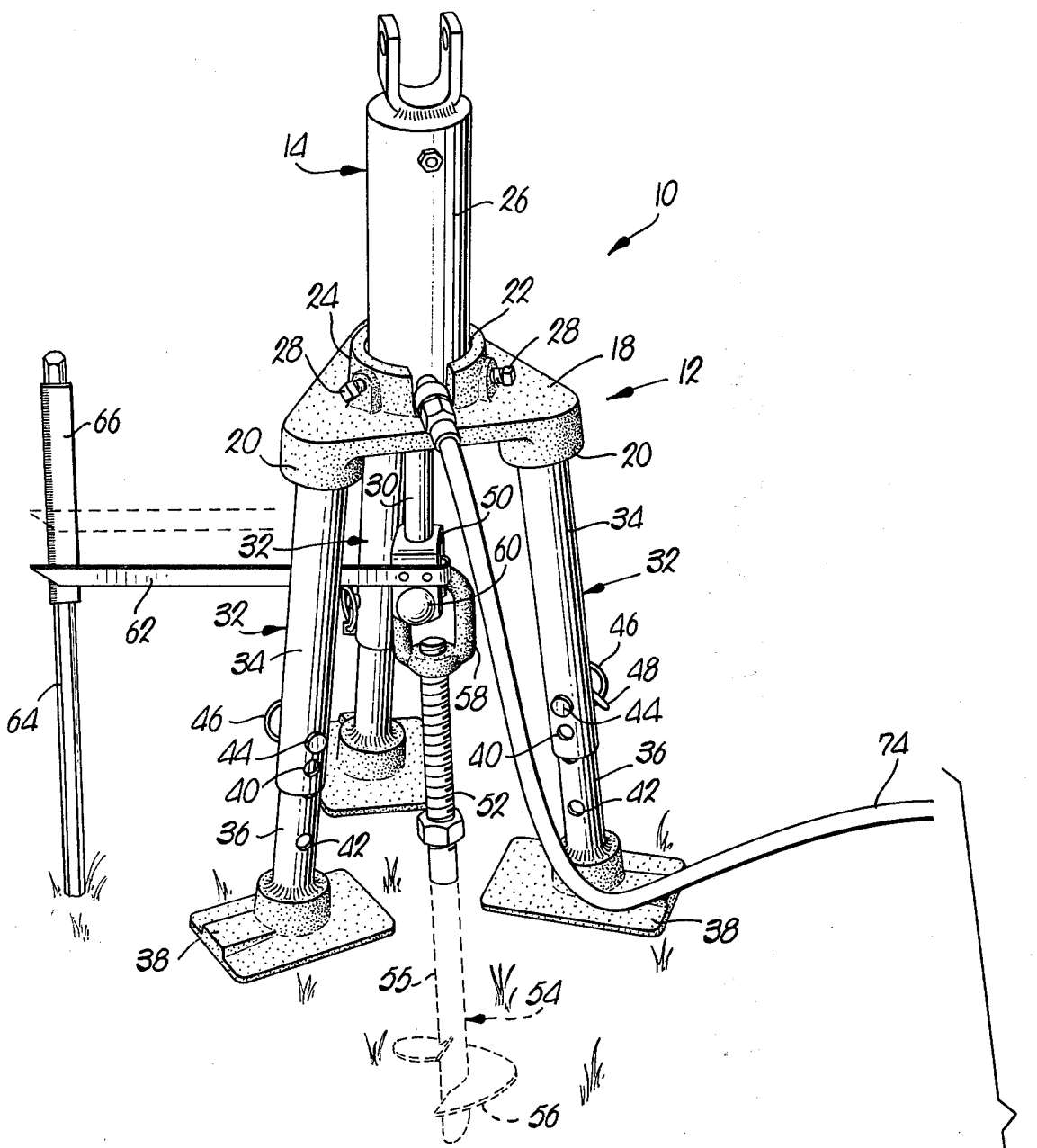
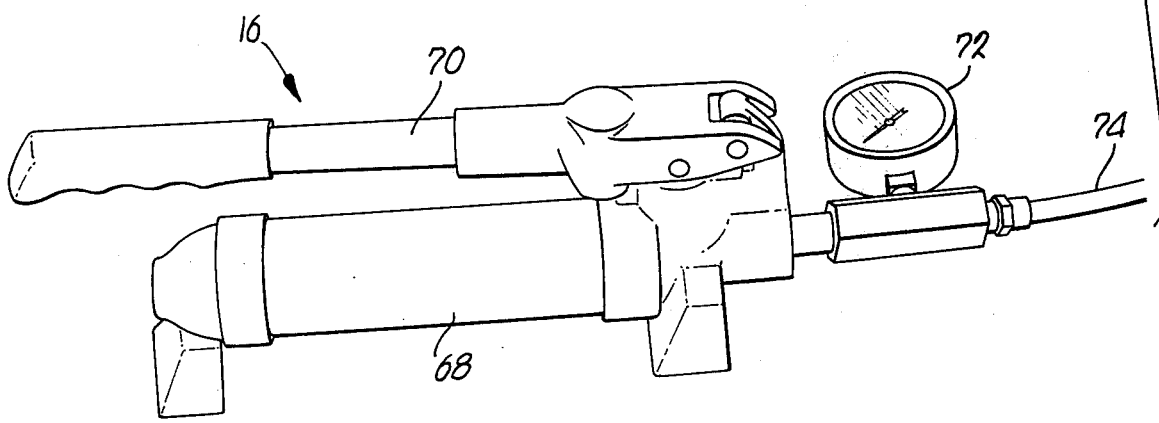

PORTABLE PULL TESTING UNIT FOR INSTALLED EARTH ANCHORS

The invention relates to pull-testing apparatus for use in measuring the load capabilities of relatively small, embedded earth anchors. More particularly, it is concerned with such pull-testing apparatus which is lightweight and compact in nature to permit use thereof in crowded work areas by a single operator, and which includes unique creep indicator structure for measuring the amount of anchor creepage separate from any settling of the loading device itself into the earth.

In recent years there has been a tremendous increase in the use of relatively small earth anchors in situations where a secure hold-down is required. For example, many states and municipalities now require that mobile homes be securely anchored to the earth to resist adverse effects from untoward wind loads. These increasingly stringent regulations have come into being because of past experience with mobile homes wherein the latter have been severely damaged or even picked up and completely destroyed during wind conditions. Thus, in order to overcome these problems, so-called "mobile home anchors" have been developed for use in conjunction with hold-down straps or the like which are positioned over the mobile homes. In this connection, many governmental agencies and insurance companies have developed specifications relating to the performance of such mobile home anchors, and accordingly there has developed a need for a small, portable testing unit to verify that installed mobile home anchors do indeed meet required load capabilities.

a major drawback with many testing machines currently used to test earth anchors stems from the very large and bulky nature thereof. Until recently, emphasis has been on testing anchors of relatively large load capacity and therefore the test units have been very large and heavy and not at all suitable for use beneath a mobile home or the like. In addition, prior testing machines have normally provided no means for measuring the extent of upward anchor creepage during pull testing independent of the downward settling of the tester itself.

One prior anchor testing device is disclosed in U.S. Pat. No. 3,738,163. The device described in this patent weighs nearly 200 pounds and utilizes a hydraulically actuated piston and cylinder assembly mounted on support structure having relatively widely spaced support legs adapted to contact the earth. Thus, not only is this patented unit far too heavy to be handled by a single operator, use thereof beneath a mobile home is severely limited by virtue of the bulky, unwieldy nature of the device. Finally, this test unit is deficient in not providing any mechanism for measuring the extent of test-induced anchor creep, which is an exceedingly important parameter needed for evaluating the load capabilities of small mobile home anchors.

It is therefore the most important object of the present invention to provide a lightweight, compact, portable pull-testing apparatus for load-testing installed earth anchors and which can be operated by a single operator beneath a mobile home or the like where space is at a premium, while moreover providing a creep measuring function for determining the load capabilities of installed, relatively small earth anchors. The compactness of the present test apparatus results principally from the discovery that generally upright, closely spaced support legs situated proximal to the protruding end of the earth anchor can be utilized without fear that erroneous test results will be generated or that the apparatus will be unsteady in use.

Another aim of the invention is to provide pull-testing apparatus of the type described wherein the anchor creep measurement structure associated therewith is capable of measuring the extent of upward anchor creepage induced during testing independently of any downward settling of the overall device which can occur as a result of reaction forces created during such testing. In particular, a separate calibrated rule is inserted into the earth adjacent the test unit with an indicator coupled to the latter for measuring the extent of anchor creep on the rule independently of any downward movement occurring by virtue of settling of the support legs into the earth adjacent the embeded anchor.

In the drawing:

The single FIGURE is a perspective view of pull-testing apparatus in accordance with the present invention, shown operatively coupled with an installed earth anchor for testing of the latter.

A compact, portable pull-testing apparatus 10 weighing only about 50 pounds is shown in the drawing and broadly includes tripod support structure 12, hydraulically actuated piston and cylinder assembly 14 mounted thereon, and hydraulic pump assembly 16 operatively coupled with piston and cylinder assembly 14 for the purpose of actuating the latter.

In particular, support structure 12 includes a generally triangular tripod platform 18 having a series of three downwardly opening, tubular leg sockets 20 spaced about the periphery of the platform at the apexes thereof. Platform 18 includes a central aperture 22 circumscribed by an upright, annular collar 24. Conventional hydraulic cylinder 26 is secured within collar 24 by means of setscrews 28, while the pressure-responsive internal piston (not shown) within cylinder 26 is journaled on a vertically oriented, downwardly extending ram 30 which extends through aperture 22 in platform 18.

A longitudinally adjustable leg assembly 32 is fixedly secured within each leg socket 20 and includes an uppermost tubular section 34, and a lowermost tubular section 36 telescoped within the latter. An earth-engaging, force-spreading foot pad 38 is fixedly secured to the lowermost end of each tubular section 36 for evenly spreading the reaction forces developed during actuation of apparatus 10 to thereby minimize settling of apparatus 10 into the earth. The respective foot pads 38 are preferably positioned closely proximal to the protruding end of the embedded anchor in order to present the most compact profile for the overall apparatus.

In this connection, each generally upright leg asembly 32 is preferably set at an angle of about 10° with respect to the vertical and is longitudinally adjustable by provision of a series of complementary, transverse bores 40 and 42 in sections 34 and 36 respectively. Releasable locking mechanism in the form of an elongated, transversely apertured locking pin 44 is provided which extends through the mated bores 40 and 42 of sections 34 and 36 for the purpose of releasably locking the latter in a desired relative position. In this respect a "klik pin" assembly 46 is preferably utilized which includes an elongated pin member 48 extending through the transverse aperture of locking pin 44 to hold the latter in position.

A generally U-shaped clevis 50 is fixedly secured to the lowermost end of ram 30 for the purpose of coupling apparatus 10 to the upright, preferably threaded, protruding end 52 of a relatively small earth anchor 54 depicted in phantom in the drawing. Representative anchor 54 includes an elongated shaft 55 having a single flight helical blade 56 adjacent the lowermost end thereof, with the threaded, uppermost end 52 of the shaft protruding above the surface of the earth. A conventional eye 58 is threadably attached at the uppermost terminus of end 52. As illustrated in the drawing, clevis 50 fits over eye 58 with a conventional, releasable transverse pin 60 extending through clevis 50 and eye 58 to complete the connection between test apparatus 10 and anchor 54.

An elongated, horizontally oriented indicator rod 62 is releasably, but fixedly secured to clevis 50 such that rod 62 moves in unison with the latter during testing operations. In addition, a separate and independent stake 64 is driven into the earth adjacent the tripod unit and includes a calibrated rule 66 attached to the upper end thereof. The end of rod 62 remote from clevis 50 extends into proximal relationship with calibrated rule 66 such that the two elements cooperatively serve to permit measurement of anchor creepage during testing operations later to be described.

Hydraulic pump assembly 16 is of the conventional variety and includes a pump chamber 68 and a reciprocable pump handle 70 for the purpose of delivering pressurized increments of hyrdraulic fluid from chamber 68. A specially calibrated pressure gauge 72 is also provided at the outlet end of pump assembly 16 for the purpose of directly indicating the load on the anchor being tested. Flexible hydraulic fluid line 74 is interconnected between the outlet of gauge 72 and cylinder 26 for the purpose of delivering pressurized hydraulic fluid to the latter to thereby move the pressure-responsive internal piston and ram 30 secured thereto.

In practice, apparatus 10 is set up over an installed earth anchor as depicted in the drawing, with clevis 50 being connected to eye 58 and foot pads 38 situated closely adjacent anchor end 52. Indicator rod 62 is provided along with independent stake 64 and rule 66 for the purpose of measuring the load-resisting capabilities of anchor 54, which may vary widely depending principally upon the type of soil into which the anchor is installed. During testing operations, pump assembly 16 is utilized to pressurize piston and cylinder assembly 14 to thereby draw ram 30 upwardly in opposition to embedded anchor 54, and any upward anchor creepage is measured as a function of the relative movement of indicator rod 62 along rule 66. Moreover, any settling of apparatus 10 induced by the downward reaction forces developed during test operations does not interfere with the accuracy of upward anchor creepage measurement, since rule 66 is supported independently of the tripod-mounted test unit. Thus, accurate test results can be obtained with the present testing apparatus in virtually all types of soils, even immediately after anchor installation.

Finally, it should also be noted that the compact nature of apparatus 10 is enhanced through the use of generally upright tripod support legs, with the earth-engaging foot pads thereof positioned closely adjacent the protruding end of anchor 54. It has heretofore been thought necessary to situate the support legs at a position somewhat remote from the earth about the embedded anchor, which in turn greatly increases the size and bulkiness of the test unit. However, in practice it has been found that the exceedingly compact and lightweight support leg arrangement disclosed produces no untoward test results, expecially when the present creep measuring apparatus is used in conjunction therewith so that any downward settling of the test unit is automatically compensated for and does not lead to inaccuracies of measurement.

Having thus described the invention, what is claimed as new and desired to be secured by Letters Patent is:

1. In combination:
    an earth anchor embedded into the earth for anchoring a mobile home or the like and having an elongated shaft with one end thereof protruding from the earth and a generally tranversely extending, loadbearing member adjacent the remaining, embedded end of said shaft;
    pull-testing apparatus, including
    selectively actuatable tensioning means positioned generally above the protruding end of said shaft for applying an upwardly directed tension force on said anchor in opposition to said load-bearing member;
    means operatively coupling said tensioning means and protruding end;
    means supporting said tensioning means including a plurality of generally upright, closely spaced support legs each having an earth-engaging, force-spreading foot pad on the lowermost end thereof which are each positioned closely adjacent the protruding end of said earth anchor shaft;
    means for determining the extent of tension forces exerted on said anchor when the tensioning means is actuated; and
    means for measuring the extent of upward anchor creepage when said tensioning means is actuated and independently of any settling of the pull-testing apparatus into the earth,
    said earth anchor and pull-testing apparatus being cooperatively configured and designed such that during actuation of said tensioning means the test results generated accurately reflect the actual load capabilities of said embedded earth anchor.

2. The combination as set forth in claim 1 wherein:
    said measuring means comprising separate and independent stake means driven substantially vertically into the ground adjacent said protruding end and having a series of vertically arranged calibrations thereon; and substantially horizontal indicator means coupled with said tensioning means, the end of said indicator means remote from said tensioning means being positioned adjacent said calibrations for indicating the extent of anchor creepage thereon during actuation of said tensioning means.

3. The combination as set forth in claim 1 wherein said tensioning means comprises a pressure-responsive piston and cylinder assembly having a depending, vertically movable ram extending therefrom and secured to the protruding end of said earth anchor, and pump means operatively connected to said cylinder for selectively actuating said piston for moving said ram upwardly to apply a tension force to said earth anchor.

4. The combination as set forth in claim 3 wherein said piston and cylinder assembly is hydraulically actuatable.

5. The combination as set forth in claim 1 wherein each of said support legs is longitudinally adjustable to permit variance of the heights thereof.

6. The combination as set forth in claim 1 wherein each of said support legs is positioned at an angle of about 10° with respect to the vertical.

7. The combination as set forth in claim 1 wherein said support means comprises a generally horizontal platform with three generally upright, depending support legs attached thereto.

* * * * *